Patented Apr. 5, 1938

2,112,846

UNITED STATES PATENT OFFICE 2,112,846

TREATMENT OF HYDROCARBONS

Vladimir Ipatieff and Herman Pines, Chicago, Ill., assignors to Universal Oil Products Company, Chicago, Ill., a corporation of Delaware No Drawing. Application May 1, 1937, Serial No. 140,163

6 Claims. (Cl. 196—10)

This invention relates to the treatment of paraffin hydrocarbons which are gaseous at ordinary temperatures and pressures, particularly isobutane.

In a more specific sense, the invention is concerned with a novel process for alkylating isobutane with olefins which are normally gaseous to produce saturated hydrocarbons of higher molecular weight which can be utilized as constituents of motor fuel for automobile and aeroplane engines.

The cracking process which is operated principally with the object of producing gasoline from heavier and less valuable petroleum fractions incidentally produces considerable yields of fixed gases comprising hydrogen, methane, ethane, propane, and butanes as well as ethylene, propylene, and butylenes in varying quantities and proportions. In most instances these gases are considered to have merely a fuel value though attempts are made from time to time to utilize the olefinic constituents for the manufacture of hydrocarbon derivatives on a commercial basis.

In one application of the present process the isobutane present in cracked gas mixtures is utilized as a source of additional yields of motor fuel fractions to augment those primarily produced by the cracking operation. While the process is particularly applicable to cracked gas mixtures and particularly selected fractions produced therefrom in the stabilizers of cracking plants, it is also applicable to the treatment of isobutane produced from any other source.

In one specific embodiment the present invention comprises the alkylation of isobutane with isobutylene at temperatures of 0° C. and below with catalysts comprising essentially aluminum chloride or hydrogen chloride or a mixture of both.

The essential feature of the present invention is the utilization of sufficiently low temperatures of treatment so that the ordinarily vigorous action of aluminum chloride in catalyzing condensation reactions among hydrocarbons is moderated and reactions of alkylation occur rather than simple polymerization of the olefin involved. In other words, at the selected low temperatures employed the rate of the polymerization reactions is reduced so that alkylation takes place in preference to polymerization.

The actual operation of the process admits of some modification depending upon the normal phase of the reacting constituents and whether batch or continuous operations are employed. In a simple type of batch operation, involving substantially only the pure compounds isobutane and isobutylene, the isobutane is cooled to 0° C. or lower in the presence of a minor percentage of anhydrous aluminum chloride and alkylation is effected by the gradual introduction of isobutylene under the surface of the liquid which may be mechanically stirred to prevent subsidence of the solid aluminum chloride particles. A small percentage of hydrogen chloride is admitted along with the stream of olefin vapor. After a treatment is completed the aluminum chloride layer is allowed to settle, and the upper hydrocarbon layer is removed by decantation and subjected to fractionation for the removal of uncombined hydrocarbons as a light overhead and the recovery of an intermediate motor fuel fraction.

In continuous operation liquid isobutane containing suspended therein the requisite amount of aluminum chloride and cooled to a suitably low temperature may be pumped through a tubular treater at the entrance to which it receives the necessary addition of isobutylene and hydrogen chloride, the desired alkylation taking place during passage through the treater and the fractionation of the product accomplished in a subsequent fractionator. The details of continuous processes of this general character are more or less familiar to those skilled in oil refinery operations and any necessary additions to or modifications of the above general procedures will be more or less obvious, and can be made without departing from the general scope of the invention.

The present process can be utilized to more or less selectively remove the four-carbon atom hydrocarbons of iso structure from cracked gas mixtures. Thus, by passing a cracked gas mixture through a suspension of anhydrous aluminum chloride in a neutral hydrocarbon solvent such as hexane or cyclohexane, the isobutane and isobutylene which may be present in such mixtures will interact to form alkyl derivatives which are principally octanes and which are readily separable from the liquid hydrocarbon layer by subsequent fractionation. To obtain the maximum yield of gasoline boiling range material, it is desirable to employ less of the isobutylene than the isobutane. For example, the yield of gasoline range material in the liquid products with 50% excess of isobutylene is about 40% while with only 60% of isobutylene by weight of the isobutane the percentage of gasoline boiling range material is about 70%.

The process may be utilized for the direct improvement of low antiknock value gasolines by suspending aluminum chloride therein at the required low temperatures and passing either a proportioned mixture of isobutane and isobutylene into the suspension along with a trace of hydrogen chloride or still more simply by passing a cracked gas mixture or a stabilizer reflux into the same gasoline. The gasoline functions both as a solvent and a reaction medium and the alkylation products are formed and blended with the gasoline at the same time to increase its antiknock value to an extent depending upon the amount of alkylated products added.

The following examples are given as illustrative of the type of results normally obtainable by the use of the present process, although they are not given with the intention of limiting the scope of the invention in exact conformity with the data presented.

Example I 50 parts by weight of isobutane were alkylated by 62 parts of isobutylene. The paraffin compound was cooled to a temperature of —30° C. and 20 parts by weight of finely divided anhydrous aluminum chloride was maintained in suspension by mechanical stirring devices. During the stirring a partially cooled stream of isobutylene was introduced along with a small quantity of hydrogen chloride. After the reaction there was a lower layer of aluminum chloride plus certain addition complexes which amounted to 30 parts by weight while the upper layer consisted of 100 parts by weight of a hydrocarbon product which was entirely paraffinic as indicated by its complete stability toward potassium permanganate solutions and nitrating mixture. This layer was water-white and 60% of it boiled below 200° C. The octane number according to the CFR motor method was 85.

Example II

To illustrate the direct application of the process in the improvement in antiknock value of a gasoline, a stabilizer reflux was passed into a paraffinic gasoline at a temperature of —20° C. in which was suspended about 5% by weight of anhydrous aluminum chloride, the necessary trace of hydrogen chloride being added to the gas mixture. The stabilizer reflux consisted of approximately 15% by volume of four-carbon atom olefins and 25% of four-carbon atom paraffins. After the passage of about 2000 cubic feet of stabilizer reflux (calculated on a gas basis) per bbl. of gasoline and the subsequent stabilization of the gasoline to a 10 lb. vapor pressure it was found that the gasoline had increased in weight by about 30% and that the octane number had been increased from an original value of 40 to 65 by the motor method. The observed increase in octane number was due principally to the alkylation of isobutane with isobutylene.

Example III

This is given to illustrate the use of the maximum temperature which has been determined as the limit of the practical operation of the process. To 72 parts by weight of isobutane at 0° C., 20 parts by weight of powdered anhydrous aluminum chloride was added and maintained in suspension by vigorous mechanical agitation. 30 parts by weight of isobutene cooled to slightly below 0° C. was added gradually to the suspension along with a small amount of hydrogen chloride. Following the completion of the reactions, the lower layer was found to consist of approximately 20 parts by weight and the upper layer of 90 parts by weight of a hydrocarbon fraction which was paraffinic in accordance with its unreactivity with potassium permanganate solutions and nitrating mixture. This fraction was water white and 80% of it boiled below 200° C. The octane number of the gasoline boiling fraction was 86 by the motor method of testing.

The foregoing specification has disclosed the character and scope of the present invention and the examples have shown its practical aspects but neither section is to be considered as unduly limiting.

This application is a continuation-in-part of our co-pending application Serial No. 42,063, filed September 25, 1935.

We claim as our invention:

1. A process for producing gasoline boiling hydrocarbons which comprises alkylating isobutane with isobutylene in the presence of aluminum chloride at temperatures of 0° C. or below.

2. A process for producing gasoline boiling hydrocarbons which comprises alkylating isobutane with isobutylene in the presence of aluminum chloride and hydrogen chloride at temperatures of 0° C. or below.

3. A process for producing gasoline boiling hydrocarbons from cracked gas mixtures containing isobutane and isobutylene, which comprises subjecting the gas mixture to the action of aluminum chloride at temperatures of 0° C. or below, whereby to alkylate the isobutane with the isobutylene.

4. A process for producing gasoline boiling hydrocarbons from cracked gas mixtures containing isobutane and isobutylene, which comprises subjecting the gas mixture to the action of aluminum chloride and hydrogen chloride at temperatures of 0° C. or below, whereby to alkylate the isobutane with the isobutylene.

5. A process for increasing the antiknock value of gasoline which comprises adding aluminum chloride to the gasoline, passing isobutane and isobutylene into the resultant mixture, maintaining the mixture at temperatures of 0° C. or below, whereby to alkylate the isobutane with the isobutylene, and recovering the gasoline containing the alkylated derivatives thus formed.

6. A process for increasing the antiknock value of gasoline which comprises adding aluminum chloride to the gasoline, passing hydrogen chloride, isobutane, and isobutylene into the resultant mixture, maintaining the mixture at temperatures of 0° C. or below, whereby to alkylate the isobutane with the isobutylene, and recovering the gasoline containing the alkylated derivatives thus formed.

VLADIMIR IPATIEFF.
HERMAN PINES.